April 3, 1934.  A. PETELER  1,953,128
SHOCK ABSORBER
Filed Feb. 7, 1929  2 Sheets-Sheet 1
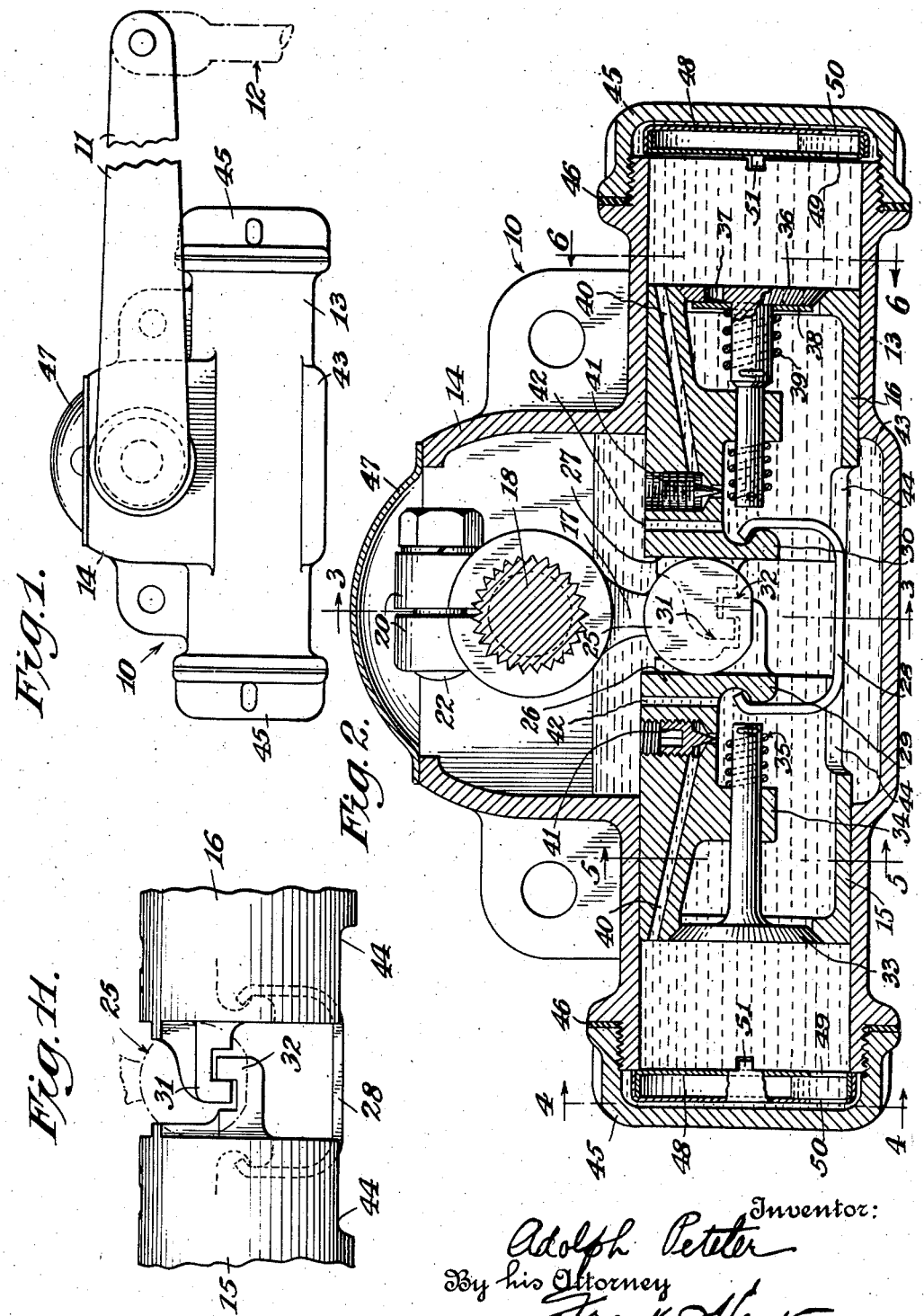

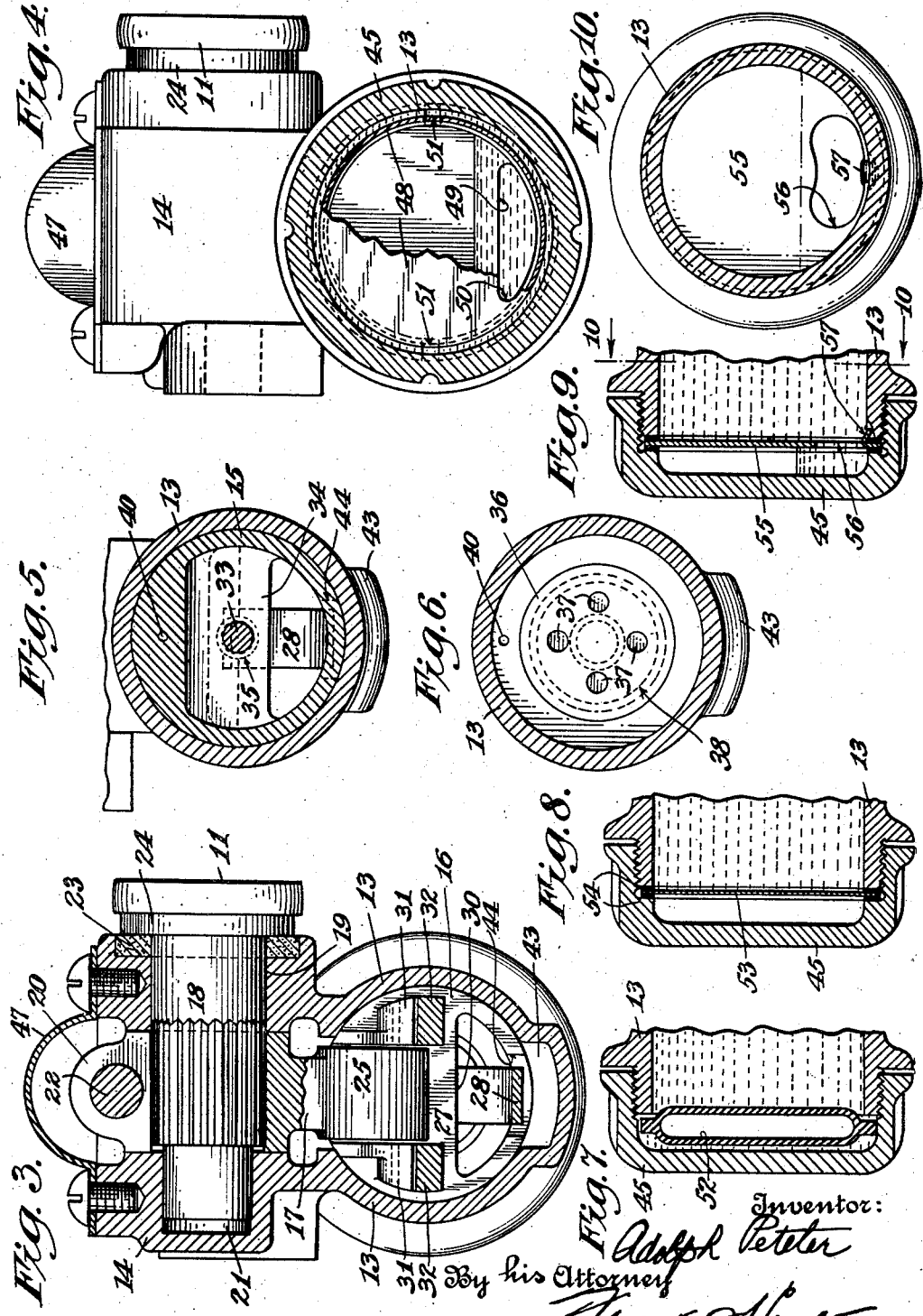

Patented Apr. 3, 1934

1,953,128

UNITED STATES PATENT OFFICE 1,953,128

SHOCK ABSORBER

Adolph Peteler, Freeport, N. Y.

Application February 7, 1929, Serial No. 338,069

21 Claims. (Cl. 188—88)

This invention relates to a shock absorber of a new and improved construction designed particularly for use on automobiles and related vehicles.

A primary object of the invention is to provide a double-acting hydraulic shock absorber of strong and simple construction, but having at the same time improved operating qualities.

Among other features, the invention involves the provision of means permitting adjustment of the resistance to movement of the axle in one direction, and separate means for adjustment of resistance to movement of the axle in the opposite direction.

Another feature resides in the provision of a piston formed of two members, a spring-and-hook coupling being used to maintain the piston members in engagement with the operating means.

The invention also comprises the provision of an air cushion at each end of the cylinder to thereby provide a limited amount of free movement of the piston before it encounters resistance, and in this way avoid "telegraphing" minor road inequalities to the occupants of the car.

These and other objects and advantages of the invention will become apparent as the description proceeds.

While I have shown preferred forms of the invention for purposes of illustration, it should be understood that various changes and modifications may be made in the structure without departing from the spirit and scope of the invention hereinafter set forth and claimed.

In the drawings:

Fig. 1 is a side elevation of the improved shock absorber.

Fig. 2 is a longitudinal section through the shock absorber.

Fig. 3 is a section on line 3—3 of Fig. 2.

Fig. 4 is a section on line 4—4 of Fig. 2.

Fig. 5 is a section on line 5—5 of Fig. 2.

Fig. 6 is a section on line 6—6 of Fig. 2.

Fig. 7 is a fragmentary section showing an alternate air chamber construction.

Fig. 8 is a view similar to Fig. 7 but showing a further possible modification.

Fig. 9 is a view similar to Fig. 7 but illustrating another variation.

Fig. 10 is a section on line 10—10 of Fig. 9.

Fig. 11 is a fragmentary elevation of the piston members.

Referring to the drawings more particularly, the device includes broadly a casing 10 and a movable arm 11. The casing 10 is to be attached to any convenient part of the chassis of the vehicle, and the arm 11 is connected in a suitable manner, as by a lever arm 12 to the axle.

The casing 10 includes a lower cylinder part indicated at 13, and an upper dome portion 14. The cylinder 13 is formed with a cylindrical bore as clearly shown in Figs. 2 and 3, and a piston is fitted for reciprocation in this cylindrical bore. The piston is formed of two piston members 15 and 16, and is reciprocated by a lever 17 splined to the shaft 18 which carries at its outer end the arm 11. The shaft 18 is slipped laterally through an opening 19 (Fig. 3) in one side of the dome 14, through a split hub 20 which carries the lever 17, and into a socket 21 formed in the opposite side of dome 14. The hub 20 is securely held on the shaft by a bolt 22 which draws the parts of the split hub together. A cork packing 23 surrounds the outer end of shaft 18, and a collar 24 carried by the shaft presses against the packing. Sufficient clearance is provided at the inner end of the shaft and also at the inner end of the splined portion so that the shaft can be adjusted inwardly to take up any wear on the packing and keep the joint tight.

The lower end of the lever 17 is formed with a rounded thrust member 25 (Fig. 2) which pushes against walls 26 and 27 formed on piston members 15 and 16, respectively. A C-shaped spring 28 hooks over projections 29 and 30 formed on the piston members and acts to resiliently press the walls 26 and 27 against the thrust member, thereby insuring prompt and noiseless operation of these parts at all times regardless of the amount of wear. The spring 28 is sufficiently stiff to cause the two piston members to move in unison when the parts are subjected to ordinary pressures, but under an unusual load the spring might give, and to keep the piston members from separating in such a case they are provided with interengaging coupling hooks 31 and 32, member 15 having two upwardly extending hooks and member 16 two downwardly extending hooks.

Each of the piston members 15 and 16 is substantially hollow, and has its outer flat face formed with a valve seat with which a valve cooperates. The valve 33 is guided in a web 34 which extends across the piston member, and is pressed toward its seat by a light spring 35.

The valve 36 shown in piston member 16 is similar to that just described, except that a series of openings 37 are formed through the valve head, and a relief valve 38 is pressed by a spring 39 against the inner face of valve 36.

Each of the piston members is formed with a passageway 40 extending from its flat face and opening into the hollow interior of the piston, each of the passages being controlled by a screw needle valve 41. Each piston member is also formed with a vertical passage 42 extending from its hollow interior to its upper surface at a point near the end carrying the coupling hook. The lower side of cylinder 13 is formed with a depressed runway 43, and the piston members 15 and 16 are formed with cut-outs 44 which cooperate with the runway. Each end of the cylinder 13 is closed by a screw cap 45 kept tight by a suitable gasket 46, thus forming a compression chamber in each end of the cylinder.

The parts as described constitute in general an improved shock absorber of the double-acting type. Prior to installation the casing is filled to about the level shown in Fig. 2 with a suitable liquid, and after installation the parts operate in the following manner:

When the vehicle negotiates a road inequality that causes the axle to move away from the chassis the outer end of arm 11 is moved downwardly, causing lever 17 to move toward the left (in Fig. 2) and pushing the piston toward the left. This movement causes valve 36 to open permitting the liquid to escape from the interior of the piston to the right end of cylinder; but at the same time the liquid at the left end of the cylinder is compressed and is forced through the passage 40 in piston member 15 into the interior of the piston. The rate at which the arm 11 is permitted to move downwardly can be regulated by opening or closing the needle valve 41 in piston member 15. For purposes of regulation the cover plate 47 is removed and a suitable wrench is applied to a hexagonal socket formed in the upper face of valve 41.

When relative movement of the chassis and axle causes the outer end of arm 11 to move upward the piston is moved in the opposite direction, or toward the right of Fig. 2. In this case the valve 33 opens to permit the liquid to flow to the left end of the cylinder and the liquid is compressed in the right end of the cylinder and escapes through the passage 40 in piston member 16 at a rate determined by the setting of the control valve 41. Should a sudden heavy upward shock be transmitted to the arm 11, the safety valve 38 will open momentarily, relieving the parts of any excessive strain. The safety valve can be arranged to open at any predetermined pressure by furnishing it with a spring of the proper stiffness, and it will be apparent that a safety valve of the type shown may be applied to either or both of the valves 33 and 38. The location of the relief valve directly on the check valve provides for a structure that can be economically manufactured and assembled.

By providing the piston members with the cutouts 44 in their lower sides and forming the runway 43 in the bottom of the cylinder, the liquid is permitted to run freely from one end of the piston to the other. The construction and operation of the parts is such that the shaft 18 may be located a considerable distance above the normal level of the liquid, thereby minimizing the possibility of liquid leaking out around the shaft.

It should be noted that the walls 34 (Figs. 2 and 5) close the piston members to a point below the center thereof. As a result of this construction, when the piston member 16 is on the suction stroke, liquid will be drawn into the corresponding compression chamber as long as the level of the reserve supply of liquid is above the lower edge of the wall 34. This is also true of piston member 15.

The vertical passages 42 permit the escape of any air that may become entrapped within the piston. It has also been found that reciprocation of the piston causes a jet to be thrown up through these passages, splashing the liquid upon the shaft and insuring its proper lubrication.

When the car is running along a stretch of road that is in good condition there are always minor irregularities in the surface that will cause the arm 11 to oscillate over a short arc, and it is desirable that the arm be left free for this slight normal oscillation without any resistance from the shock absorber. For this purpose the present invention furnishes an air cushion within the cylinder so that the first part of the movement of the piston must be used to compress the air cushion before any resistance is encountered.

In Fig. 2 the air cushion is illustrated as taking the form of a flat circular box 48 which is airtight except for openings 49 and 50 formed in the flat sides near the periphery. The box 48 carries lugs 51 which co-operate with recesses in the end of the cylinder to insure the proper placing of the box 48 with the openings 49 and 50 at the bottom when the parts are in the position of Fig. 2. One of the air cushions is provided at each end of the cylinder 13, and as the casing 10 is filled with liquid, air is trapped in the upper part of each of the boxes 48.

Upon movement of the piston in either direction the first part of the movement serves merely to force the liquid into the box 48 and to compress the air in the upper part of the box. As soon as the air has been compressed to a certain extent the piston meets resistance, and the liquid is forced through the restricted passage in the piston. In this manner the air cushions provide for a limited amount of free movement of the piston in either direction. Since the box 48 is full floating, i. e. entirely surrounded by the resistive liquid, the internal and external pressures on the box are substantially the same at all times, and the box may be made of very thin material.

By changing the vertical location of the holes 49 and 50 it is possible to vary the amount of air trapped in the air chamber, and thereby vary the amount of free oscillation of the arm 11.

Fig. 7 shows another method of providing an air cushion in the end of the cylinder. In this case the air is confined in a disc-shaped rubber bag 52, which is held in place between the cap 45 and the end of the cylinder.

In Fig. 8 the air cushion is provided by clamping a flexible diaphragm 53 between the cap 45 and the end of the cylinder. A gasket 54 must be placed on each side of the diaphragm to insure an air-tight joint.

Figs. 9 and 10 illustrate a still further modification in which a disc 55 is clamped with gaskets between the end cap 45 and the cylinder. Here the lower side of the disc is provided with an aperture 56, and a lip 57 engages in a notch in the cylinder to insure proper position of the disc with the opening at the bottom of the cylinder. Here again the air is trapped behind the disc in a manner similar to that already explained in connection with Fig. 2.

The advantages inherent in the improved shock absorber described above will be evident to one skilled in the art, but particular attention should be drawn to the fact that the construction permits adjustment of the amount of resistance offered to upward movements of the lever arm 11 independently from the adjustment of the amount of resistance to downward movement of the arm.

I claim:

1. A shock absorber comprising a casing having a cylinder formed therein, a piston reciprocable in the cylinder, a lever pivotally mounted in the casing and connected to the piston, a closure member attached to each end of the cylinder to form a compression chamber at each end of the piston, the piston being formed with a separate passage permitting escape of liquid from each compression chamber, two adjustable valves mounted on the piston, each valve controlling the rate of flow through one of the passages, the casing being formed with an opening permitting access to the valves for purposes of adjustment, and a removable cover secured over the opening.

2. A shock absorber comprising a casing having a cylinder formed therein, a piston reciprocable in the cylinder, an outwardly-opening check valve mounted on each end of the piston, a lever pivotally mounted in the casing and connected to the piston, a closure member attached to each end of the cylinder to form a compression chamber at each end of the piston, the piston being formed with two escape passages, each of the escape passages permitting escape from one of the compression chambers, and two adjustable valves mounted on the piston, each adjustable valve controlling the rate of flow through one of the passages.

3. A shock absorber comprising a casing having a cylinder formed therein, a piston reciprocable in the cylinder, the piston being formed of two separate piston members, a lever pivotally mounted in the casing and carrying a thrust member, a spring normally holding the piston members in contact with the thrust member, a closure member attached to each end of the cylinder to form a compression chamber at each end of the piston, parts of the shock absorber being formed with passages permitting escape of liquid from each compression chamber.

4. A shock absorber comprising a casing having a cylinder formed therein, a piston reciprocable in the cylinder, the piston being formed of two separate piston members, a lever pivotally mounted in the casing and carrying a thrust member, a spring normally holding the piston members in contact with the thrust member, interengaging hooks carried by the piston members, a closure member attached to each end of the cylinder to form a compression chamber at each end of the piston, parts of the shock absorber being formed with passages permitting escape of liquid from each compression chamber.

5. A shock absorber comprising a casing having a cylinder formed therein, a piston reciprocable in the cylinder, the piston being composed of two separate piston members, the piston members being formed with hollow cavities open toward each other, a lever pivotally mounted in the casing and carrying a thrust member, a C-shaped spring normally holding the piston members in contact with the thrust member, a closure member attached to each end of the cylinder to form a compression chamber at each end of the piston, parts of the shock absorber being formed with passages permitting escape of liquid from each compression chamber.

6. A shock absorber comprising a casing having a cylinder formed therein, a piston reciprocable in the cylinder, the piston being composed of two separate piston members, a wall extending across the inner end of each piston member, a ridge formed on the inner face of each wall, a lever pivotally mounted in the casing and carrying a thrust member, a C-shaped spring formed of flat stock, each end of the spring being hooked over one of the ridges, the spring normally holding the piston members in contact with the thrust member.

7. A shock absorber comprising a casing having a cylinder formed therein, a piston reciprocable in the cylinder, the piston being composed of two separate piston members, a wall extending across the inner end of each piston member, a pair of spaced-apart, upwardly extending hooks projecting from one of the piston members, a pair of spaced-apart, downwardly extending hooks projecting from the other piston member, the hooks of one member engaging the hooks of the other member to prevent separation of the piston members, a ridge formed on the inner face of each wall, a lever pivotally mounted in the casing and carrying a thrust member, a C-shaped spring formed of flat stock, each end of the spring being hooked over one of the ridges, the spring normally holding the piston members in contact with the thrust member.

8. A shock absorber comprising a casing having a cylinder formed therein, a piston reciprocable in the cylinder, the piston being composed of two separate piston members, the piston members being formed with hollow cavities open toward each other, a lever pivotally mounted in the casing and carrying a thrust member, a spring normally holding the piston members in contact with the thrust member, an outwardly opening check valve mounted on the outer end of each piston member, a closure member attached to each end of the cylinder to form a compression chamber at each end of the piston, parts of the shock absorber being formed with passages permitting escape of liquid from each compression chamber.

9. A shock absorber comprising a casing having a cylinder formed therein, a pair of piston members reciprocable in the cylinder, the piston members being formed with hollow cavities opening toward each other, a lever pivotally mounted in the casing and carrying a thrust member, a spring normally holding the piston members in contact with the thrust member, an outwardly-opening check valve mounted on the outer end of each piston member, a closure member attached to each end of the cylinder to form a compression chamber at each end of the piston, each piston member being formed with a passage communicating with a compression chamber and with the hollow cavity of the piston member.

10. A shock absorber comprising a casing having a cylinder formed therein, a pair of piston members reciprocable in the cylinder, the piston members being formed with hollow cavities opening toward each other, a shaft mounted in the casing above the piston members, an external lever attached to the shaft, a lever attached to the shaft within the casing and carrying a thrust member between the piston members, coupling means connecting the piston members, an outwardly-opening check valve mounted on the outer end of each piston member, a closure member attached to each end of the cylinder to form a compression chamber at each end of the piston, each piston member being formed with a passage communicating with a compression chamber and with the hollow cavity of the piston member.

11. A shock absorber comprising a casing having a cylinder formed therein, a pair of piston members reciprocable in the cylinder, the piston members being formed with hollow cavities opening toward each other, a lever pivotally mounted in the casing and carrying a thrust member between the piston members, coupling means connecting the piston members, an outwardly-opening check valve mounted on the outer end of each piston member, a closure member attached to each end of the cylinder to form a compression chamber at each end of the piston, each piston member being formed with a passage communicating with a compressing chamber and with the hollow cavity of the piston member, each piston member being also formed with a vertical passage extending from the hollow cavity of the piston member to the upper side of said member at the end adjacent the thrust member.

12. A shock absorber comprising a casing having a cylinder formed therein, a piston reciprocable in the cylinder, operating means connected with the piston, an outwardly-opening check valve mounted on each end of the piston, an inwardly-opening relief valve mounted on one of the check valves, a closure member attached to each end of the cylinder to form a compression chamber at each end of the piston, the piston being formed with passages permitting escape of liquid from each compression chamber.

13. A shock absorber comprising a casing having a cylinder formed therein, a piston reciprocable in the cylinder, operating means connected with the piston, an outwardly-opening poppet valve mounted on each end of the piston, a spring normally biasing the poppet valve to closed position, an inwardly-opening relief valve mounted on one of the poppet valves, a closure member attached to each end of the cylinder to form a compression chamber at each end of the piston, parts of the shock absorber being formed with passages permitting escape of liquid from each compression chamber.

14. A shock absorber comprising a casing having a cylinder formed therein, a pair of piston members reciprocable in the cylinder, operating means connected with the piston members, each end of the piston being formed with a valve seat, a guide carried by the piston at a point spaced from each seat, an outwardly-opening poppet valve co-operating with each seat and having a stem engaging one of the guides, a coil spring surrounding the stem of each valve and engaging the guide and a stop on the stem to bias the valve to closed position, an inwardly-opening relief valve mounted on one of the poppet valves, a closure member attached to each end of the cylinder to form a compression chamber at each end of the piston, parts of the shock absorber being formed with passages permitting escape of liquid from each compression chamber.

15. A shock absorber comprising a casing having a cylinder formed therein, a pair of piston members reciprocable in the cylinder, operating means connected with the piston members, each end of the piston being formed with a valve seat, a guide carried by the piston at a point spaced from each seat, an outwardly-opening poppet valve co-operating with each seat and having a stem engaging one of the guides, a coil spring surrounding the stem of each valve and engaging the guide and a stop on the stem to bias the valve to closed position, one of the poppet valves being perforated, a disc on the inner side of last-named poppet valve to close the apertures, and a spring biasing the disc toward the poppet valve, a closure member attached to each end of the cylinder to form a compression chamber at each end of the piston, parts of the shock absorber being formed with passages permitting escape of liquid from each compression chamber.

16. A shock absorber comprising a casing having a cylinder formed therein, a piston reciprocable in the cylinder, operating means connected with the piston, a closure wall carried by the end of the cylinder to form a compression chamber in which liquid may be compressed, part of the shock absorber being formed with a restricted passage permitting escape of the liquid from the compression chamber, and a box in the compression chamber substantially in line with the movement of the piston, the box being closed except for an opening near one edge, and interengaging means on the chamber and box to maintain the box in a position with the opening of the box located below the axis of the cylinder.

17. A shock absorber comprising a casing having a cylinder formed therein, a piston reciprocable in said cylinder, the piston being composed of two separate members, an actuator extending between the piston members, a spring normally holding said piston members in contact with said actuator, and additional means interconnecting said piston members to prevent undue tensioning of said spring.

18. A shock absorber comprising a casing having a cylinder formed therein, a piston reciprocable in said cylinder, the piston being composed of two separate piston members, a wall extending across the inner end of each piston member, a depression formed in the inner face of each of said walls, an actuator engaging the outer face of each of said walls, and a spring having its ends hooked into said depressions, the spring normally holding the piston members in contact with the actuator.

19. A shock absorber including a casing having formed therein a cylinder within which a liquid is contained, a piston operable within said cylinder to displace the liquid, operating means connected with said piston, and a full floating air chamber immersed in the liquid at one end of the cylinder in line with the piston travel and within which air is compressed as said piston is moved.

20. A shock absorber including a casing having formed therein a cylinder within which a liquid is contained, a piston operable within said cylinder to displace the liquid, operating means connected with said piston, and a perforated partition extending across and providing within said cylinder at one end thereof, in line with the piston travel, a relatively small air chamber within which air is compressed by the liquid passing thru said perforation as said piston is moved, the opposite faces of said partition being subject to air pressure and fluid pressure respectively.

21. A shock absorber comprising in combination, a casing providing a cylinder; a fluid displacement member in said cylinder comprising two separate portions; an actuator for said fluid displacement member; resilient means connected between the two separate portions of the displacement member normally urging said portions into engagement with the actuator; and means adapted to limit the stretching of said resilient means and to provide a positive connection between said portions of the displacement member.

ADOLPH PETELER.